United States Patent Office 3,639,587
Patented Feb. 1, 1972

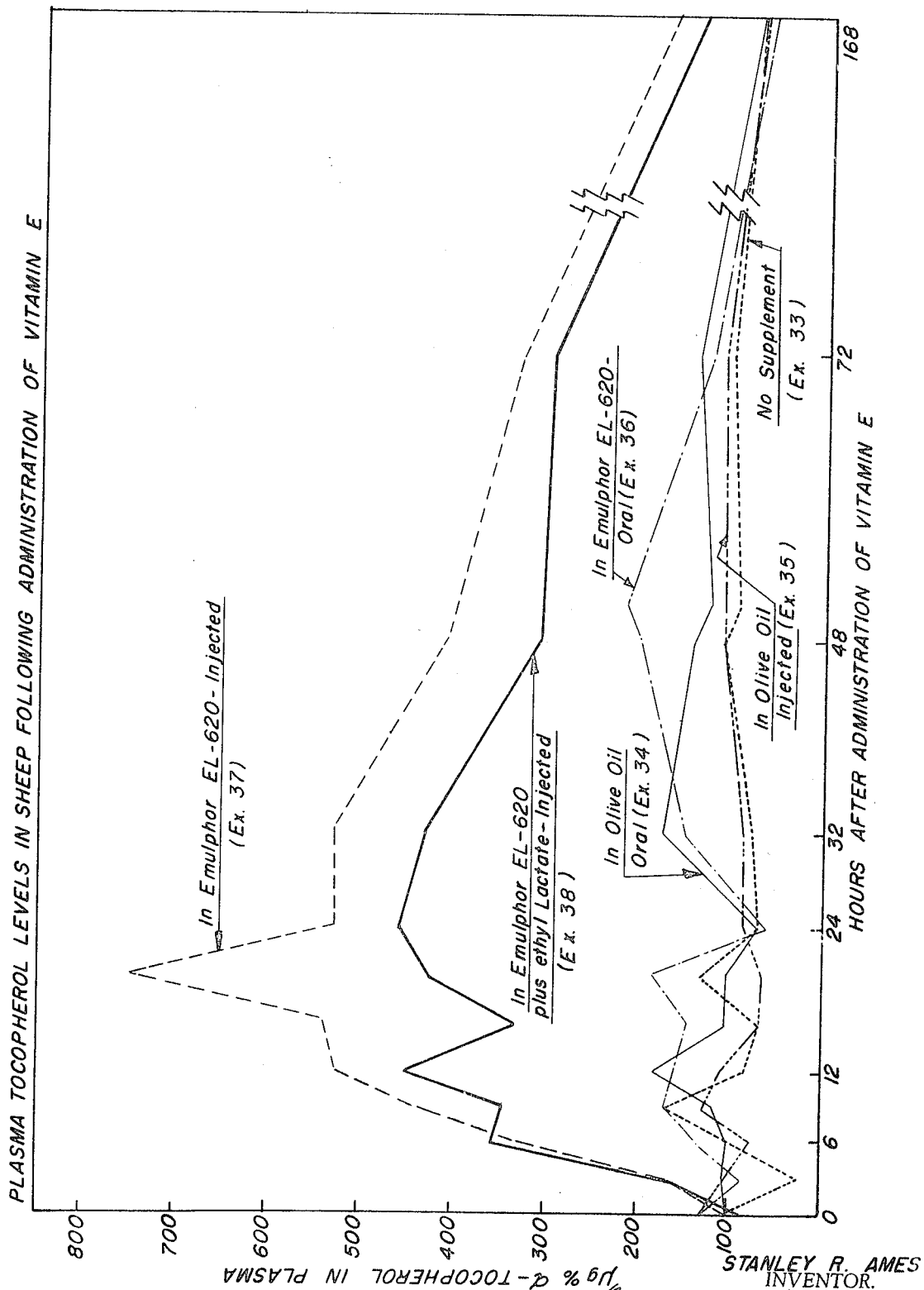

3,639,587
MEDICINAL COMPOSITIONS FOR ADMINISTRATION TO ANIMALS, AND PROCESS FOR ADMINISTERING SAME
Stanley R. Ames, Rochester, N.Y., assignor to Eastman Kodak Company, Rochester, N.Y.
Continuation of application Ser. No. 625,467, Mar. 23, 1967. This application Nov. 7, 1969, Ser. No. 871,590
Int. Cl. A61k *15/02, 15/10*
U.S. Cl. 424—173       28 Claims

ABSTRACT OF THE DISCLOSURE

An essentially non-aqueous medicinal preparation for injection into animals, comprising a medicinal and either a polyoxyethylene sorbitan fatty acid ester, or a polyoxyethylated ricinoleate (e.g. polyoxyethylated castor oil). The preparation can also include an organic ester as a viscosity reducing agent. Among the medicinals are vitamins A and E; and others such as hormones, steroids, detoxifiers, and anthelmintics.

CROSS REFERENCE TO RELATED APPLICATION

This application is a continuation of application Ser. No. 625,467, filed Mar. 23, 1967 which is a continuation-in-part of application Ser. No. 399,869 filed Sept. 28, 1964, both now abandoned.

BACKGROUND OF THE INVENTION

Field of the invention

This invention relates to the administration of lipid (oil) soluble medicinals to animals and the like, and more especially to the administration of vitamins such as vitamins A and E alone, or mixed together or with others such as vitamin D.

It is sometimes desired to dose domestic animals with oil soluble medicinals such as vitamins, antibiotics, hormones, steroids, anthelmintics or detoxifiers, yet administration orally is ineffective either because the animal is so sick as to have stopped eating; or the particular medicinal is not well utilized when administered orally. Among such animals are sheep, bovines, poultry, horses, swine, dogs, cats, and experimental rats.

I have discovered that excellent results are secured when oil soluble medicinals are administered by intramuscular injection, using the novel compositions and techniques to be described in detail hereinafter.

SUMMARY OF THE INVENTION

In general, my novel medicinal preparation is a flowable essentially non-aqueous composition consisting essentially of the oil soluble medicinal and oil-and-water soluble polyoxyethylene material (to be identified in more detail below) at a concentration in the range of at least about 25% by weight of the medicinal, and up to 20 times the weight of the medicinal. It is also important for the medicinal preparation to have a crystallization temperature low enough (e.g. 4° C. or less) so that small crystals will not form at ambient temperature conditions such as may occur outdoors on a farm. In addition, viscosity reducing agents are included in some of my novel compositions.

My novel medicinals are characterized by high bioavailability, and experience has shown that they cause little or no muscle damage when injected. Muscle damage is particularly detrimental in cattle, sheep and swine because it reduces the quality and grade of the meat when the animal is slaughtered.

In general, the injectable medicinals of my invention are prepared by admixing the various components at about 25–40° C. In the case of high-viscosity preparations, the injectable medicinal is packaged by introducing it into a cartridge, sterilized and introduced into an injection gun for administration. In the case of low-viscosity preparations, the injectable medicinal is packaged by introducing it into a bottle with a suitable rubber closure, and, after sterilization, is suitable for use in an injection syringe. Alternatively, the injectable medicinal may be sterilized and introduced into a sterile container under sterile conditions.

The principles of the invention will be described hereinafter primarily as exemplified in vitamin A and vitamin E compositions. However, it is to be understood that they also apply to other medicinal compositions which will also be exemplified.

By "flowable" is meant a consistency such that the composition is quite fluid, as well as one which is paste-like but will flow under pressure. Compositions having viscosities which range from about 50 to 450 centipoises at 20° C. have been used successfully.

By "essentially non aqueous" is meant a composition containing no water, but it is to be understood that a water content ranging from 0 to 10% of the preparation by weight can be tolerated within this term without sacrificing much of the advantages.

DESCRIPTION OF THE DRAWING

The single figure of the drawing shows the blood plasma tocopherol level in sheep following administration of vitamin E by the intramuscular injection of compositions embodying the invention, contrasted with oral administration thereof; and contrasted with both oral administration and injection of other compositions.

THE PREFERRED EMBODIMENTS

Vitamin A

Injectable vitamin A compositions based on either vitamin A alcohol or vitamin A palmitate have been known, but have not been completely satisfactory.

For example, injectable vitamin A preparations based on vitamin A alcohol have the disadvantage of low biological availability of the vitamin A material. Another disadvantage is the slow absorption of vitamin A from the injection site. It is extremely important from a practical standpoint for intramuscularly injectable vitamin A preparations to be rapidly utilized. The sooner the vitamin A is absorbed and utilized following injection, the more rapid is the recovery of the animal. Still another disadvantage is that these preparations induce severe damage to muscle at the site of injection.

Intramuscularly injectable vitamin A preparations based on vitamin A palmitate exhibit high biological utilization and induce only moderate damage to the muscle at the site of injection. However, for maximum biological utilization the preparation must include an absorption promoter (an agent which functions to promote absorption of the vitamin A material into the animal) at a weight ratio to the vitamin A palmitate of at least about 7:1 and preferably higher. Consequently, an intramuscularly injectable vitamin A potency of 500,000 or more USP units per milliliter, which is highly desirable in order to minimize the size of the injected dose with high biological utilization is not possible with vitamin A palmitate.

In injectable compositions of the prior art it has been usual to include a substantial amount of water in the composition. Such aqueous compositions necessarily have smaller vitamin potencies than are possible with the present novel essentially non aqueous compositions.

For years the principal carrier for the vitamin A material has been vegetable oil. However, the vitamin A in these vegetable oil preparations is poorly utilized after intramuscular injection into animals. Modified vegetable oil containing Polysorbate 80 (polyoxyethylene (20) sorbitan monooleate) in an amount less than 1% by weight of the vitamin A material (vitamin A alcohol) has also been used, but without much improvement in results.

This invention, as it pertains to vitamin A, is based upon the discovery that flowable essentially non aqueous preparations consisting essentially of vitamin A esters of aliphatic monocarboxylic acids having from 2 to 5 carbon atoms, together with a polyoxyethylene condensate of certain properties (at a concentration of at least 25% by weight of said ester), are highly effective and avoid the disadvantages of these prior art preparations when administered by intramuscular injection to animals.

Vitamin A esters can be prepared in the all-trans form, or can be prepared as a reaction product mixture containing both all-trans and isomers. When such a mixture contains all-trans and isomeric ester which is prinicpally the 13-mono-cis isomer (also known as the neo isomer) it generally contains about 65% all-trans and about 35% other isomers. Another mixture contains 45–55% all-trans and 45–55% of the isomers 13-mono-cis, 9-mono-cis, and 9,12-di-cis.

Vitamin acetate

Vitamin A acetate is the acetic acid ester of vitamin A alcohol. It exists in a number of isomeric forms, with all-trans vitamin A acetate having the most biological activity. Hence, for preparations of maximum vitamin A potency all-trans vitamin A acetate is preferred. At 20° C. it is a normally crystalline solid. All-trans vitamin A acetate is available in the pure condition and in liquid concentrates. In such concentrates the concentration of all-trans vitamin A acetate is at least about 10% by weight of the concentrate, with innocuous oily material constituting the remaining portion.

In preferred embodiments of this invention the preparation, in addition to all-trans vitamin A acetate, also contains at least one isomer of vitamin A acetate. Examples of isomers of all-trans vitamin A acetate are 13-mono-cis (also known as neo vitamin A acetate), 9-mono-cis and 9,13-di-cis vitamin A acetate. A reaction product mixture may contain the all-trans and mainly the neo isomer (e.g. 30%), or it may contain all-trans and 45–55% of all three other isomers. The isomers of all-trans vitamin A acetate, which are normally liquid at 20° C. and as yet have not been isolated in crystalline form, have less vitamin A potency than all-trans vitamin A acetate. However, the presence of at least one isomer with the all-trans lowers the crystallization temperature of the vitamin A acetate in the vitamin A preparation. The reduction in crystallization temperature is proportional to the total concentration of all isomers of all-trans vitamin A acetate, or, stated another way, the concentration of isomeric vitamin A acetate. Consequently, in these embodiments the concentration of isomeric vitamin A acetate is at least sufficient to substantially reduce the crystallization temperature of the vitamin A acetate. One reason why a reduction in crystallization temperature is desired is that injectable vitamin A preparations are frequently administered outdoors at temperatures below the normal crystallization temperature of all-trans vitamin A acetate. Crystal formation in the preparation is to be avoided because of the possibility of crystals blocking the syringe and injection needle. Under these circumstances the crystallization temperature of the vitamin A acetate in the preparation should be below about 4° C. For a crystallization temperature below about 4° C., the concentration of isomeric vitamin A acetate is at least about 30% by weight of the all-trans vitamin A acetate. This is equivalent to about 23% by weight of all the vitamin A acetate present. This means that at most about 77% by weight of all the vitamin A acetate in the preparation is all-trans vitamin A acetate.

The polyoxyethylene material in the preparations of this invention functions to promote absorption of the oil-soluble medicinals, exemplified by vitamin A acetate. In some embodiments of this invention, as when solid vitamin A acetate is employed, the polyoxyethylene material is normally liquid. In other embodiments of this invention wherein a liquid vitamin A acetate concentrate is employed, or solid vitamin A acetate and an innocuous oil as a carrier therefor are employed, the polyoxyethylene material can be either liquid or normally solid.

The polyoxyethylene material consists essentially of at least one nontoxic innocuous oil-and-water soluble polyoxyethylene condensate. Preferred examples of such a condensate, which include identification of at least one commercial embodiment thereof in each case (all normally liquids except one), and which are useful in all embodiments of the invention, are:

(1) Oil-and-water soluble polyoxyethylene sorbitan fatty acids esters such as:

Polyoxyethylene (20) sorbitan monostearate (Tween 60)—a solid at 20° C.

Polyoxyethylene (20) sorbitan monooleate (Tween 80—also called Polysorbate 80).

Polyoxyethylene (20) sorbitan monolaurate (Tween 20).

The number in parentheses following "polyoxyethylene" indicates the average number of oxyethylene units per sorbitan ester unit.

(2) Oil-and-water soluble polyoxyethylated ricinoleates, which are the active ingredients in oxyethylated vegetable oils, and particularly:

Polyoxyethylated castor oil (Emulphor EL–620 and Emulphor EL–719).

In addition to vitamin A ester and the oil-and-water soluble polyoxethylene material, preferred embodiments of my injectable vitamin A preparations comprise additional non-aqueous components.

A number of these embodiments include at least one other fat-soluble vitamin-active component such as a vitamin E active component, a vitamin D active component and the like. Concentration of each additional fat-soluble vitamin-active component is generally in a range from about 0.01 to about 10% by weight of the preparation.

Preferred embodiments of my injectable vitamin A preparation also comprise one or more antioxidants for the vitamin A ester and any other components susceptible to oxidative degradation. Suitable antioxidants are butylated hydroxy-anisole (BHA), butylated hydroxytoluene (BHT), tocopherols, and the like.

Preferred embodiments of my injectable vitamin A preparation also include at least one component which functions to inhibit the growth of microorganisms which might be introduced into the preparation under use conditions. A preferred example of such a component is benzyl alcohol.

A number of the preferred embodiments of my intramuscularly injectable vitamin A preparation, as well as other medicinals described hereinafter, comprise a viscosity reducing agent which is compatible with the vitamin and with the tissue of the receiving animal. This is a low molecular weight innocuous liquid ester of an organic acid, of low toxicity, which has a substantially lower viscosity than the preparation without the agent, and preferably is liquid to a temperature at least as low as 4° C. A viscosity reducing agent is desirable in some instances because the solution of vitamin A ester (or other medicaments to be described hereinafter) in polyoxyethylene material may have a viscosity too high for small syringes and small bore needles. A suitable viscosity for such equipment is generally in a range from about 50 to about 80 centipoises at 25° C. The concentration of the viscosity reducing agent, therefore, is dependent to a large extent on the desired viscosity of the preparation, and on the viscosity of the preparation without the viscosity reducing agent. In general, it must be sufficient to reduce the viscosity to that desired. A concentration in a range from about 1 to 40% by weight of the preparation is usually satisfactory for this purpose.

Examples of preferred viscosity reducing agents under the concepts of this invention include diethyl succinate, ethyl oleate, isopropyl myristate, lactic acid carboxamide, ethyl lactate, diethyl carbonate, ethyl propionate, methyl propionate, ethyl butyrate, and mixtures thereof with one another. Diethyl carbonate, ethyl lactate, and ethyl propionate are of particular value because compositions containing them cause a minimum of muscle damage when injected.

The injectable vitamin A preparations of this invention, described in the following examples, are made by admixing the components at 25–40° C. They are particularly useful for the intramuscular injection of vitamins A, D and E into animals.

By vitamin A "bioavailability" values in the following tables is meant values determined using bioassay techniques in accordance with Ames, S. R. and Harris, P. L. "Slope-ratio Liver-Storage Bioassay for Vitamin A," Analytical Chem., vol. 28(5), 874–8 (1956).

Bioavailability was determined by:
(a) Injecting into vitamin A-depleted male rats the specified compositions.
(b) Orally supplementing vitamin A-depleted male rats all-trans-vitamin A acetate in Wesson oil.
(c) Orally suplying male rats feed and water without vitamin A supplementation (negative control animals).

The rats were sacrificed after 10 days and their livers assayed for vitamin A. From the average assays for the supplemented rats (a) and (b) was subtracted the average assay for the unsupplemented rats (c). The differences measured the biological utilization of the vitamin A supplements, and the bioavailability from the injection technique (a) was expressed as percent (%) of the oral standard (b).

Tables I and II below contain examples based on polyoxyethylene (20) sorbitan monooleate and monostearate as the absorption promotor.

TABLE I [1]

| Example | 1 | 2 | 3 | 4 |
|---|---|---|---|---|
| Vitamin A acetate concentrate | 18.1 | 28.7 | 22.3 | 10.2 |
| Percent all-trans | 100 | 55 | 69 | 95 |
| Percent isomeric | 0 | 45 | 31 | 5 |
| Vitamin D concentrate | 0.019($D_2$) | 0.15($D_3$) | 0.14($D_2$) | 0.071($D_2$) |
| Vitamin E concentrate | 3.84 | 2.55 | 3.75 | 1.84 |
| Benzyl alcohol | 0.95 | 0.95 | 1.93 | 1.89 |
| Butylated hydroxyanisole | 0.24 | 0.17 | 0.24 | 0.24 |
| Butylated hydroxytoluene | 0.24 | 0.17 | 0.24 | 0.24 |
| Polyoxyethylene (20) sorbitan monooleate | 76.6 | 73.7 | 65.4 | 85.5 |
| Vitamin A potency in U.S.P. units/cc | 480,000 | 441,000 | 544,000 | 295,000 |
| Vitamin D potency in I.U./cc | 4,600 | 37,000 | 57,800 | 30,000 |
| Vitamin E potency in I.U./cc | 53 | 36 | 52 | 26 |
| Bioavailability after 10 days (percent of oral standard) | 105 | 104 | 100 | 133 |
| Viscosity—centipoises at 25° C | >300 | >300 | >300 | >300 |

[1] Percent concentrations are by weight; other concentrations are parts by weight. No viscosity reducing agent used.

TABLE II [1]

| Example | 5 | 6 | 7 | 8 | 9 | 10 | 11 |
|---|---|---|---|---|---|---|---|
| Vitamin A acetate concentrate | 28.0 | 24.5 | 24.7 | 58.4 | 44.0 | 28.7 | 5.14 |
| Percent all-trans | 70 | 63 | 63 | 55 | 55 | 55 | 55 |
| Percent isomeric | 30 | 37 | 37 | 45 | 45 | 45 | 45 |
| Vitamin $D_2$ concentrate | 0.17 | 0.14 | 0.15 | 0.34 | 0.26 | 0.17 | 0.042 |
| Vitamin E concentrate | 4.25 | 3.76 | 3.80 | 8.56 | 6.33 | 4.20 | 0.82 |
| Benzyl alcohol | 1.93 | 1.93 | 1.95 | 1.99 | 1.98 | 1.95 | |
| Butylated hydroxyanisole | 0.24 | 0.24 | 0.24 | 0.25 | 0.25 | 0.24 | |
| Butylated hydroxytoluene | 0.24 | 0.24 | 0.24 | 0.25 | 0.25 | 0.24 | |
| Polyoxyethylene (20) sorbitan monooleate | 65.2 | 69.2 | 44.5 | 30.2 | 46.9 | 64.5 | |
| Polyoxyethylene (20) sorbitan monostearate | | | | | | | 94 |
| Diethyl succinate | 0 | 0 | 24.4 | 0 | 0 | 0 | 0 |
| Vitamin A potency in U.S.P. units/cc | 706,000 | 537,000 | 519,000 | 1,184,000 | 853,000 | 572,000 | 100,000 |
| Vitamin $D_2$ potency in I.U./cc | 70,500 | 58,200 | 61,800 | 136,000 | 105,000 | 70,000 | 16,800($D_3$) |
| Vitamin E potency in I.U./cc | 59 | 53 | 53 | 116 | 86 | 58 | 11 |
| Bioavailability after 10 days (percent of oral standard) | 121 | 109 | 94 | 92 | 106 | 104 | 87 |
| Viscosity—centipoises at 25° C | >300 | >300 | <100 | >300 | >300 | >300 | >300 |

[1] Percent concentrations are by weight; other concentrations are parts by weight.

The following Table III contains examples illustrating specific embodiments of the injectable vitamin A acetate preparation of this invention, which embodiments are based on oil and water soluble polyoxyethylated castor oil (Emulphor EL–620) as the solubilizing agent. As in the preceding examples, these embodiments also have vitamin D activity and vitamin E activity.

TABLE III [1]

| Example | 12 | 13 | 14 | 15 | 16 | 17 |
|---|---|---|---|---|---|---|
| Vitamin A acetate (percent) | 5.14 | 23.68 | 48.4 | 22.83 | 24.58 | 55.83 |
| Percent all-trans | 55 | 65 | 55 | 55 | 72 | 65 |
| Percent isomeric | 45 | 35 | 45 | 45 | 28 | 35 |
| Vitamin $D_2$ (percent) | 0.042 | 0.13 | 0.30 | 0.16 | 0.12 | 0.28 |
| Vitamin E (percent) | 0.82 | 3.75 | 7.80 | 3.82 | 3.83 | 7.69 |
| Benzyl alcohol (percent) | | 1.97 | 2.00 | 1.96 | 1.97 | 2.02 |
| BHA (percent) | | 0.25 | 0.26 | 0.14 | 0.25 | 0.25 |
| BHT (percent) | | 0.25 | 0.26 | 0.14 | 0.25 | 0.25 |
| Polyoxyethylated castor oil (percent) | 94 | 69.98 | 40.98 | 70.95 | 69.01 | 33.66 |
| Vitamin A potency U.S.P. units/cc | 100,000 | 511,700 | 1,131,000 | 574,000 | 562,000 | 1,204,000 |
| Vitamin $D_2$ potency, U.S.P. units/cc | 16,800 | 52,000 | 120,000 | 60,000 | 50,000 | 100,000 |
| Vitamin E potency, I.U./cc | 11 | 50 | 100 | 50 | 50 | 50 |
| Bioavailability after 10 days (percent of oral standard) | 84 | 106 | 105.4 | 101.2 | 100.8 | 98.3 |
| Viscosity—centipoises at 25° C | >300 | >300 | >300 | >300 | >300 | >300 |

[1] Percent concentrations are by weight. No viscosity reducing agent used.

The above specific embodiments are characterized by high biological utilization as verified by actual tests on animals, rapid biological utilization and a minimum of muscle damage such as from foreign body type of reaction at the injection site.

In my parent application the all-trans plus isomeric vitamin A acetate compositions described above were found to have reduced crystallization temperatures below 4° C., which is an important attribute for an injectable medicinal composition. Now it has been found that injectable compositions based on vitamin A esters having 3 to 5 carbon atoms, i.e. propionate, butyrate, and valerate (or mixtures with one another or with the acetate), have the same important attribute of remaining free of crystals at low temperatures of 4° C. or lower, whether in the all-trans state, or all-trans mixed with isomers.

Vitamin A propionate, butyrate and valerate

These examples, delineated in Tables IV and V below, illustrate specific embodiments of the injectable vitamin A propionate, butyrate and valerate preparations, and mixtures with the acetate. All examples are based on polyoxyethylated castor oil as the absorption promotor.

2—slight—muscle reaction is apparent but not deemed commercially objectionable
3—moderate—muscle reaction objectionable
4—severe—muscle reaction involves most if not all the leg muscle The injectable preparations tested all had the following approximate composition:

Vitamin A propionate—500,000 units/cc.
Vitamin D (calciferol)—50,000 units/cc.
Vitamin E (d-α-tocopheryl acetate)—50 units/cc.
Benzyl alcohol—2%
BHA+BHT—0.50%
Polyoxyethylated castor oil qs. 100 cc.

The experimental results are summarized as follows:

| Viscosity reducing agent | Level, percent | Muscle reaction score |
|---|---|---|
| None | 0 | 0 |
| Ethyl lactate | 37.1 | 0.4 |
| Ethyl propionate | 25 | 0.4 |
| Diethyl carbonate | 30 | 0.4 |
| Diethyl succinate | 35 | 3.0 |

TABLE IV [1]

| Example | 18 | 19 | 20 | 21 | 22 | 23 |
|---|---|---|---|---|---|---|
| Vitamin A ester (percent) | 23.4 | 48.24 | 47.21 | 49.33 | 23.08 | 23.86 |
| Type [2] | Acetate-⅓ Propionate-⅓ Butyrate-⅓ | Acetate-⅓ Propionate-⅓ Butyrate-⅓ | Propionate | Butyrate | Propionate | Butyrate |
| Vitamin D₂ (percent) | 0.15 | 0.3 | 0.3 | 0.30 | 0.16 | 0.16 |
| Vitamin E (percent) | 3.82 | 7.89 | 7.83 | 7.92 | 3.83 | 3.83 |
| Benzyl alcohol (percent) | 1.96 | 2.02 | 2.01 | 2.03 | 1.96 | 1.96 |
| BHA (percent) | 0.25 | 0.26 | 0.26 | 0.26 | 0.14 | 0.14 |
| BHT (percent) | 0.25 | 0.26 | 0.26 | 0.26 | 0.14 | 0.14 |
| Polyoxyethylated castor oil, percent | 70.15 | 41.03 | 42.12 | 38.89 | 70.70 | 69.91 |
| Vitamin A potency, U.S.P. units/cc | 521,300 | 1,100,000 | 1,129,000 | 1,111,000 | 561,000 | 549,700 |
| Vitamin D₂ potency, U.S.P. units/cc | 50,000 | 100,000 | 100,000 | 100,000 | 50,000 | 50,000 |
| Vitamin E potency, I.U./cc | 50 | 100 | 100 | 100 | 50 | 50 |
| Bioavailability after 10 days (percent of oral standard) | 125.5 | 120.3 | 116.7 | 115.4 | 110.2 | 110.1 |
| Viscosity-centipoises at 25° C | >300 | >300 | >300 | >300 | >300 | >300 |

[1] Percent concentrations are by weight. No viscosity reducing agent used.
[2] Each ester comprised about 65% all-trans and about 35% isomeric.

TABLE V [1]

| Example | 24 | 25 | 26 | 27 | 28 | 29 | 30 | 31 | 32 |
|---|---|---|---|---|---|---|---|---|---|
| All-trans vitamin A ester | [2] | [2] | [2] | [2] | [2] | [2] | Butyrate | Butyrate | Valerate |
| Vitamin A ester (percent) | 17.6 | 43.5 | 21.5 | 22.2 | 21.8 | 73.3 | 22.1 | 46.4 | 23.35 |
| Vitamin D₂ (percent) | 0.15 | 0.30 | 0.15 | 0.15 | 0.15 | 0.30 | 0.148 | 0.304 | 0.15 |
| Vitamin E (percent) | 3.82 | 7.80 | 3.84 | 3.95 | 3.90 | 7.80 | 3.85 | 7.90 | 3.89 |
| Benzyl alcohol (percent) | 1.96 | 2.00 | 1.97 | 2.02 | 2.00 | 2.00 | 1.97 | 2.02 | 1.98 |
| BHA (percent) | 0.24 | 0.44 | 0.25 | 0.25 | 0.25 | 0.26 | 0.26 | 0.26 | 0.26 |
| BHT (percent) | 0.24 | 0.44 | 0.25 | 0.25 | 0.25 | 0.26 | 0.26 | 0.26 | 0.26 |
| Viscosity red. agent (percent) | None | None | [3] 36.5 | [4] 20.2 | [5] 25.0 | None | None | None | None |
| Polyoxyethylated castor oil (percent) | 75.99 | 45.52 | 35.54 | 50.98 | 46.6 | 26.0 | 71.1 | 43.1 | 70.3 |
| Overall vitamin A potency (U.S.P. units/cc.) | 571,200 | 1,120,000 | 570,900 | 582,200 | 565,200 | 1,588,000 | 581,400 | 1,139,000 | 567,900 |
| Overall vitamin D₂ potency (U.S.P. units/cc.) | 50,000 | 100,000 | 50,000 | 50,000 | 50,000 | 100,000 | 50,000 | 100,000 | 50,000 |
| Overall vitamin E potency (I.U./cc.) | 50 | 100 | 50 | 50 | 50 | 100 | 50 | 100 | 50 |
| Bioavailability (percent of oral standard) | 128.1 | 144.3 | 121.2 | 115.6 | 129.2 | 104.8 | 110.0 | 125.2 | 114.4 |
| Viscosity—centipoises at 25° C | >300 | >300 | <100 | <100 | <100 | >300 | >300 | >300 | >300 |

[1] Percent concentrations are by weight.
[2] Propionate.
[3] Ethyl lactate.
[4] Ethyl propionate.
[5] Diethyl carbonate.

Tables IV and V demonstrate that good bioavailability, as measured by liver uptake in rats, is obtained with injectable compositions containing vitamin A propionate, butyrate, and valerate individually, or in various combinations. At equivalent potencies, all were better sources for liver vitamin A than the acetates alone, although the latter were very good sources.

The effect of various viscosity reducing agents (the viscosity lowering diluent) on muscle reaction was studied in rats in the following experiment.

Vitamin A depleted rats were injected intramuscularly with 0.1 cc. of a series of vitamin ADE injectables. Ten days post administration, the animals were sacrificed and the leg muscles evaluated for degree of muscle reaction by the following scoring system:

0—no reaction
1—very slight—muscle does not appear quite normal

These results show that vitamin ADE injectables containing ethyl lactate, ethyl propionate and diethyl carbonate produced practically no muscle reaction whereas the muscle reaction produced by a vitamin ADE injectable containing diethyl succinate was "moderate" which would be commercially objectionable in animals to be slaughtered for meat (although not objectionable where the animal is not to be slaughtered).

In general, animals are safely and effectively injected with vitamin A in dosages ranging from 1,000 to 10,000 units of vitamin A per kilogram of body weight. For example, an older lamb weighing 40 kg. will receive between 40,000 and 400,000 units; a steer weighing 200 kg. will receive between 200,000 and 2,000,000 units; a steer weighing 400 kg. will receive between 400,000 and 4,000,000 units. The size of individual injections will vary with the potency, but the animals can easily tolerate injections of 5 cc. or more, as required. The improved results as to bioavailability and muscle damage described above with respect to vitamin A injections in experimental rats have been confirmed in sheep and cattle with selected preparations.

Vitamin E

The operability of my invention in compositions comprising vitamin E in amounts up to 10% by weight was demonstrated in Examples 1 to 22 of my parent application. It has now been shown that the principles extend also to compositions wherein vitamin E is the principal or only medicinal present, as shown in the following examples. By vitamin E is meant d-alpha tocopherol and esters thereof. Compositions containing up to 58% of vitamin E by weight without a viscosity reducing agent, and up to 37% with such an agent have been used successfully.

Groups of 3 lambs each were given about 250 I.U. of d-alpha tocopheryl acetate either orally as an olive oil solution, or as an Emulphor EL–620 polyoxyethylated castor oil based formulation; and by intra muscular injection of an oil solution, or Emulphor EL–620 polyoxyethylated castor oil based formulations with and without ethyl lactate as a viscosity reducer. Blood plasma tocopherol levels were measured at various times from 0 to 168 hours.

In the tests, 16 recently weaned lambs weighing about 65 pounds each were kept individually on platforms in stalls and were given straw and water ad libitum for 5 days before, and during the entire experiment. Prior to the experiment the lambs were shorn over the neck and the right hind leg. Oral supplements were given in ¼ oz. gelatin capsules. Injected supplements were given intramuscularly in the right hind leg with an 18 gauge needle. Blood samples were taken by jugular venipuncture, the plasma was removed, and tocopherol levels were determined by chromatography on silica gel coated sheets.

The examples tabulated below record the test results. In each case the vitamin E was d-alpha tocopheryl acetate, and the plasma level stated was the average of 3 sheep in the group (except for the single control sheep of Example 33).

which 255 units were present per 0.5 ml., result in a 2550 unit dose for such a 5 cc. injection.

In general, the polyoxyethylated castor oils are those condensation products which contain from about 20 to about 40 moles of ethylene oxide per mole of castor oil. However, castor oil-ethylene oxide condensation products combining from about 30 to about 35 moles of ethylene oxide per mole of castor oil are particularly effective and preferred. Such condensation products may be readily prepared in the manner described in German Pat. No. 694,178, published on July 27, 1940. A number of these products are available commercially from the General Aniline and Film Corporation under the name "Emulphor," e.g., Emulphor EL–620 and Emulphor EL–719, and from the Process Chemicals Company under the name "Prosol" such as, for example, Prosol E–4329.

Another important advantage of my non-aqueous injectable compositions over aqueous compositions is that they are much more potent, thus requiring much smaller volumes to be injected and reducing the possibility of muscle damage.

I claim:

1. A flowable, intramuscularly injectable, non-aqueous, vitamin-active preparation characterized by a crystallization temperature of below about 4° C., consisting essentially of
   (a) from 6 to 81.4% by weight of said preparation of at least one of oil-soluble vitamin A, vitamin D, d-alpha tocopherol or esters of d-alpha tocopherol;
   (b) oil-and-water soluble polyoxyethylene material at a concentration in the range of about 25% by weight to 20 times the weight of said vitamin-active compound, said polyoxyethylene material being selected from the group consisting of polyoxyethylene sorbitan fatty acid esters containing an average of 20 units of oxyethylene per unit of sorbitan ester and polyoxyethylated castor oil containing 20 to 40 moles of ethylene oxide per mole of castor oil;
   (c) viscosity reducing agent in an amount between 0 and 40 percent by weight, said viscosity reducing agent being selected from the group consisting of diethylsuccinate, ethyl oleate, isopropylmyristate, lactic acid carboxamide, methyl propionate, ethyl propionate, ethyl butyrate, diethyl carbonate, and ethyl lactate;

said vitamin-active preparation being characterized by high bioavailability and the production of little or no muscle damage when injected.

TABLE VI

| Example | Vitamin E supplement | Density, g./ml. | Administration | Volume (ml.) | I.U. | Alpha tocopherol level in plasma, µg percent [1] | | | | | | | | | | |
|---|---|---|---|---|---|---|---|---|---|---|---|---|---|---|---|---|
| | | | | | | 0 | 3 | 6 | 9 | 12 | 16 | 20 | 24 | 32 | 48 | 72 | 168 |
| 33 | None | | | | | 112 | 20 | 98 | 172 | 83 | 67 | 130 | 67 | 77 | 109 | 106 | 72 |
| 34 | In olive oil | .921 | Oral | 1.0 | 250 | 100 | 103 | 99 | 117 | 184 | 106 | 107 | 69 | 175 | 144 | 141 | 80 |
| 35 | do | .921 | I.M. | 1.0 | 250 | 132 | 101 | 73 | 129 | 113 | 70 | 63 | 85 | 86 | 105 | 110 | 69 |
| 36 | In polyoxyethylated castor oil.[2] | 1.0 | Oral | 0.5 | 255 | 131 | 84 | 128 | 170 | 162 | 144 | 183 | 62 | 152 | 203 | 126 | 66 |
| 37 | do | 1.0 | I.M. | 0.5 | 255 | 104 | 170 | 329 | 440 | 524 | 540 | 746 | 525 | 528 | 412 | 328 | 172 |
| 38 | In polyoxyethylated castor oil plus ethyl lactate.[3] | 1.02 | I.M. | 1.0 | 255 | 88 | 168 | 356 | 346 | 448 | 334 | 429 | 457 | 430 | 308 | 299 | 140 |

[1] To nearest whole number.
[2] 19 (wt.) d α tocopheryl acetate; 2% benzyl alcohol (bacteriostat); 79% polyoxyethylated castor oil.
[3] 19% (wt.) d α tocopheryl acetate; 2% benzyl alcohol; 39% polyoxyethylated castor oil; 40% ethyl lactate.
Note.—I..=Intramuscularly.

It is apparent that the solution of d-alpha tocopheryl acetate in oil was worthless as an injectable; and the polyoxyethylated castor oil formulation given orally gave only a slight response. In contrast, the intra muscularly injected polyoxyethylated castor oil based formulations produced rapid increases in vitamin E in the blood plasma which were maintained at high levels even after 72 hours.

The single figure of the drawing graphically represents the data set forth numerically in Table VI.

Another composition which can be used for vitamin E administration (250 I.U./cc.) comprises d-alpha tocopherol 19% by weight, polyoxyethylated castor oil—43%, diethyl carbonate—36%, and benzyl alcohol—2%. This composition has a density of .99 g./cc. and a viscosity of 50 centipoises.

Typical safe and effective dosages of injected vitamin E will range between 5 and 255 units for lambs, and between 25 and 2,000 units for cattle, with individual injections as large as 5 cc. or more being tolerated with ease. Calculations based on Examples 36 and 37, in 2. A vitamin-active preparation in accordance with claim 1 wherein said vitamin-active compound is at least one selected from the group consisting of vitamin A esters of aliphatic monobasic carboxylic acid having from 2–5 carbon atoms, d-alpha tocopherol and esters of d-alpha tocopherol.

3. A vitamin-active preparation in accordance with claim 2 wherein said vitamin-active compound is predominantly alpha tocopherol or an ester thereof.

4. A vitamin-active preparation in accordance with claim 1 wherein said polyoxyethylene material is a condensation product of castor oil and ethylene oxide containing 20 to 40 moles of ethylene oxide per mole of castor oil.

5. A vitamin-active preparation in accordance with claim 4 wherein said at least one vitamin-active compound is predominantly vitamin A propionate.

6. A vitamin-active preparation in accordance with claim 5, also containing vitamin D and alpha tocopherol acetate, each in an amount between 0.01 and 10% by weight of said preparation.

7. A vitamin-active preparation in accordance with claim 1 wherein said polyoxyethylene material is a polyoxyethylene sorbitan fatty acid ester selected from the group consisting of polyoxyethylene (20) sorbitan monostearate, monooleate and monolaurate.

8. A vitamin-active preparation in accordance with claim 1 wherein said viscosity reducing agent is present in an amount between 1 and 40% by weight.

9. A vitamin-active preparation in accordance with claim 8 wherein said viscosity reducing agent is selected from the group consisting of ethyl lactate, ethyl propionate and diethyl carbonate.

10. A vitamin-active preparation in accordance with claim 8 wherein said vitamin-active compound is predominantly d-alpha-tocopherol or esters thereof.

11. A vitamin-active preparation in accordance with claim 8 wherein said vitamin-active compound is predominantly vitamin A propionate.

12. A vitamin-active preparation in accordance with claim 1 wherein:
(a) said oil-soluble vitamin-active material is predominantly vitamin A propionate by weight; and
(b) said polyoxyethylated material is polyoxyethylated castor oil containing 20 to 40 moles of ethylene oxide per mole of castor oil; and wherein said
(c) viscosity reducing agent is present in an amount between 1 and 40% by weight of said preparation, said viscosity reducing agent being selected from the group consisting of ethyl lactate, ethyl propionate, and diethyl carbonate.

13. A process for administering vitamin A to an animal which comprises intramuscularly injecting into said animal a flowable preparation in accordance with claim 1, the dosage being between about 1000 and 10,000 units of vitamin A per kilogram of body weight.

14. A process for administering vitamin A to an animal which comprises intramuscularly injecting into said animal a flowable preparation in accordance with claim 8, the dosage being between about 1000 and 10,000 units of vitamin A per kilogram of body weight.

15. A process for administering vitamin A to an animal which comprises intramuscularly injecting into said animal a flowable preparation in accordance with claim 12, the dosage being between 1000 and 10,000 units of vitamin A per kilogram of body weight.

16. A process for administering vitamin E to an animal which comprises intramuscularly injecting into said animal a flowable preparation in accordance with claim 3, the dosage being between 5 and 2550 units per animal.

17. A process in accordance with claim 16 wherein said dosage is between 5 and 255 units for lambs, and between 25 and 2000 units for cattle.

18. A process for administering $d$-alpha-tocopherol or an ester thereof to an animal which comprises intramuscularly injecting into said animal a flowable preparation in accordance with claim 1, the dosage being between about 5 and 2550 units per animal.

19. A process for administering $d$-alpha-tocopherol or an ester thereof to an animal which comprises intramuscularly injecting into said animal a flowable preparation in accordance with claim 8, the dosage being between about 5 and 2550 units per animal.

20. A flowable, intramuscularly injectable, non-aqueous vitamin-active preparation characterized by a crystallization temperature below about 4° C., consisting essentially of
(a) from 6 to 81.4% by weight of said preparation of an oil-soluble vitamin-active compound selected from the group consisting of (I) a combination of vitamin A, vitamin D, and $d$-alpha-tocopherol or an ester thereof, and (II) $d$-alpha-tocopherol or an ester thereof, alone;
(b) oil-and-water soluble polyoxyethylene material at a concentration in the range of about 25% by weight to 20 times the weight of said vitamin-active compound, said polyoxyethylene material being selected from the group consisting of polyoxyethylene sorbitan fatty acid esters containing an average of 20 units of oxyethylene per unit of sorbitan ester and polyoxyethylated castor oil containing 20 to 40 moles of ethylene oxide per mole of castor oil;
(c) viscosity reducing agent in an amount between 0 and 40% by weight, said viscosity reducing agent being selected from the group consisting of diethylsuccinate, ethyl oleate, isopropylmyristate, lactic acid carboxamide, methyl propionate, ethyl propionate, ethyl butyrate, diethyl carbonate, and ethyl lactate; said vitamin-active preparation being characterized by high bioavailability and the production of little or no muscle damage when injected.

21. A vitamin-active preparation in accordance with claim 20 wherein said vitamin A is a vitamin A ester of aliphatic monobasic carboxylic acids having from 2–5 carbon atoms.

22. A vitamin-active preparation in accordance with claim 20 wherein said ester of $d$-alpha-tocopherol is alpha-tocopheryl acetate.

23. A vitamin-active preparation in accordance with claim 20 wherein said polyoxyethylene material is polyoxyethylene sorbitan fatty acid ester selected from the group consisting of polyoxyethylene sorbitan monostearate, monooleate and monolaurate.

24. A vitamin-active preparation in accordance with claim 20 wherein said viscosity reducing agent is present in an amount between 1 and 40% by weight.

25. A vitamin-active preparation in accordance with claim 24 wherein said viscosity reducing agent is selected from the group consisting of ethyl lactate, ethyl propionate and diethyl carbonate.

26. A vitamin-active preparation in accordance with claim 20 wherein said polyoxyethylene material is a condensation product of castor oil and ethylene oxide containing 20 to 40 units of ethylene oxide per unit of castor oil.

27. A vitamin-active preparation in accordance with claim 20 wherein said vitamin-active compound is predominantly vitamin A propionate.

28. A vitamin-active preparation in accordance with claim 20 wherein
(a) said oil-soluble vitamin-active material is predominantly vitamin A propionate;
(b) said polyoxyethylated material is polyoxyethylated castor oil containing 20 to 40 moles of ethylene oxide per mole of castor oil; and
(c) wherein said viscosity reducing agent is present in an amount between 1 and 40% by weight of said preparation, said viscosity reducing agent being selected from the group consisting of ethyl lactate, ethyl propionate, and diethyl carbonate.

References Cited

UNITED STATES PATENTS

| | | | |
|---|---|---|---|
| 2,310,479 | 2/1943 | Vollmer | 424—284 |
| 2,822,316 | 2/1958 | Richter | 424—365 |
| 3,026,249 | 3/1962 | Ames | 424—255 |

(Other references on following page)

UNITED STATES PATENTS

| | | | |
|---|---|---|---|
| 3,070,499 | 12/1962 | Mullins et al. | 424—278 |
| 3,136,794 | 6/1964 | Maxwell | 260—410 |
| 3,244,595 | 4/1966 | Feigh | 424—342 |

OTHER REFERENCES

Atlas Surfactants, 1962, p. 12.

Gregory, "Uses and Applications of Chemical and Related Materials," 1939, pp. 236–237.

Durans, "Solvents," 1944, p. 119.

ALBERT T. MEYERS, Primary Examiner

N. A. DREZIN, Assistant Examiner

U.S. Cl. X.R.

424—236, 237, 284, 344; 99—107

PO-1050
(5/69)

UNITED STATES PATENT OFFICE
CERTIFICATE OF CORRECTION

Patent No. 3,639,587      Dated February 1, 1972

Inventor(s) Stanley R. Ames

It is certified that error appears in the above-identified patent and that said Letters Patent are hereby corrected as shown below:

Column 3, line 6, "1%" should be --17%--; line 29, "Vitamin acetate" should be --Vitamin A Acetate--. Column 9, line 27, "ad libitum" should be --ad libitum-- or italicized; Table VI, example 35, under 72, "110" should be --113--; Table VI, Note: "I..= Intramuscularly" should be --I.M.= Intramuscularly--.

Signed and sealed this 25th day of July 1972.

(SEAL)
Attest:

EDWARD M. FLETCHER, JR.
Attesting Officer

ROBERT GOTTSCHALK
Commissioner of Patents